United States Patent
Bodzak

(10) Patent No.: US 6,537,038 B2
(45) Date of Patent: Mar. 25, 2003

(54) SUPPLY PUMP HAVING A VARIABLE DRIVE GEAR UNIT

(75) Inventor: Stanislaw Bodzak, Elsbethen (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/989,954

(22) Filed: Nov. 20, 2001

(65) Prior Publication Data

US 2002/0102177 A1 Aug. 1, 2002

(30) Foreign Application Priority Data

Nov. 30, 2000 (DE) ......................................... 100 59 422

(51) Int. Cl.⁷ .......................... F04B 49/08; F04B 49/20; F04C 2/18; F04C 15/04
(52) U.S. Cl. ..................... 417/213; 417/218; 418/206.1; 464/2
(58) Field of Search ................................ 417/212, 213, 417/218; 418/206.1; 464/2, 42–44; 403/373, 374.1–374.4

(56) References Cited

U.S. PATENT DOCUMENTS 2,413,081 A * 12/1946 Shaeffer .................. 418/206.1
3,077,921 A * 2/1963 Zubaty et al. .............. 417/213

FOREIGN PATENT DOCUMENTS

DE 196 38 332 A1 3/1998

* cited by examiner

*Primary Examiner*—John J. Vrablik
(74) *Attorney, Agent, or Firm*—Michael J. Striker

(57) ABSTRACT

A device for supplying liquids, particularly fuel, has a first drive shaft (32) and a supply pump (30) having at least one supply member (40) coupled to a second drive shaft (36), whereby the first drive shaft (32) drives the second drive shaft (36) via a drive unit (60). The drive unit (60) is preferably a tapered ring drive, which has a first frictional bevel gear (62) connected to the first drive shaft (32) and a second frictional bevel gear (64) connected to the second drive shaft (36), whereby the first and second friction bevel gears (62, 64) roll off one another by a tapered ring (66) disposed between the two bevel gears. The tapered ring (66) is movable for changing the gear ratio of the gear unit (60) as a function of the supply pressure produced by the supply pump (30). In this manner, with a lower supply pressure, a large gear ratio of the gear unit (60) is determined, and with an increased supply pressure, a smaller gear ratio of the gear unit (60) is determined. Thus, with a low rotational speed of the supply pump (30) which produces a low supply pressure, the gear ratio of the gear unit is made larger, and correspondingly, the supply volume and the supply pressure is increased.

8 Claims, 3 Drawing Sheets

SUPPLY PUMP HAVING A VARIABLE DRIVE GEAR UNIT

BACKGROUND OF THE INVENTION

The present invention relates to a device for delivering fluids, in particular, fuel.

One such device is described in DE 196 38 332 A1. This device has a drive shaft, which, for example, is indirectly rotatably driven by means of an internal combustion engine. In addition, the device has a supply or delivery pump, which has at least one supply member that is coupled to a drive shaft. The drive shaft drives the drive shaft by means of a gear, which, by way of example, is a spur gearing having a constant gear ratio. This known device serves to deliver fuel to a high-pressure pump, which, in turn, supplies fuel under high pressure to injection sites on the internal combustion engine. Driving of the delivery pump takes place with a rotational speed which is proportional to the rotational speed of the internal combustion engine. Upon starting the internal combustion engine, when this is only driven with a low rotational speed, the supply pump is correspondingly driven with a low rotational speed, so that, under these circumstances, a fuel volume is supplied which is too small to ensure starting of the engine.

Particularly, with a higher fuel temperature and a lower rotational speed of the internal combustion engine, for example, due to insufficient voltage of a vehicle voltage source used to start the engine, insufficient fuel quantities are supplied by the delivery pump. The gear ratio of the gear could therefore be modified so that the supply pump is driven with a higher rotational speed or the supply pump could be so dimensioned that it supplies a larger fuel volume. However, then, upon normal operating rotational speed of the internal combustion engine by the supply pump, an excessively large fuel volume would be delivered, which must be controlled.

SUMMARY OF THE INVENTION

In contrast to the above-described device, the device of the present invention provides the advantage that, through the use of a tapered ring gear, the supply pump is driven with a variable gear ratio, which, with smaller rotational speed of the drive shaft and a lower supply pressure, is larger, so that the supply pump is driven with a higher rotational speed. With a higher rotational speed of the drive shaft and a higher supply pressure, the supply pump is driven with a variable gear ratio that is smaller so that the supply pump is driven with a correspondingly lower rotational speed. Therefore, an increase of the supply volume with a lower rotational speed of the drive shaft is obtained, without proportionally increasing the supply volume upon a higher rotational speed of the drive shaft. The present invention also contemplates a simple manner for producing the tapered ring gearing depending on the supply pressure.

DETAILED DESCRIPTION OF THE PREFERRED EMBODIMENTS

Figure 1:
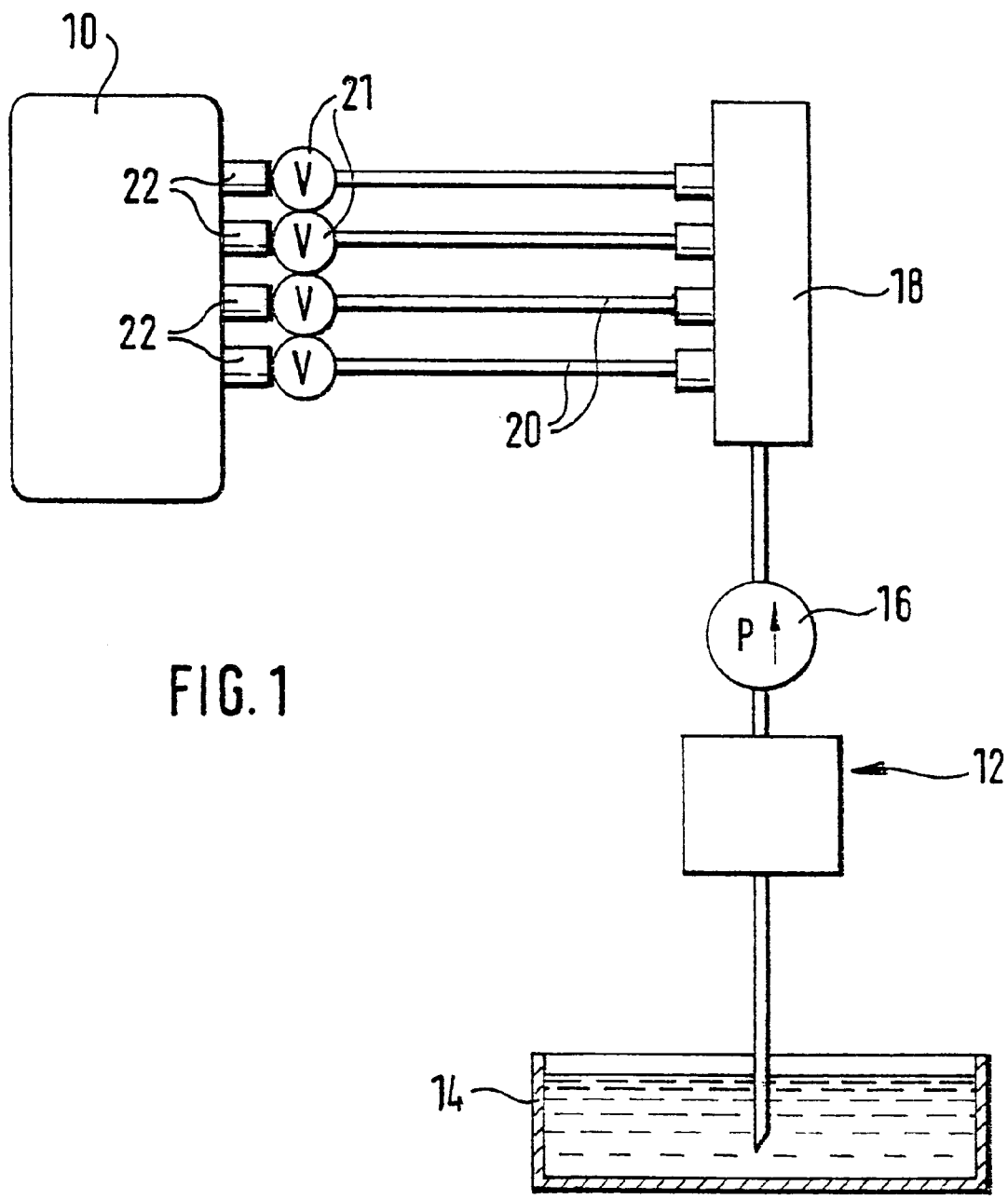
FIG. 1 shows the fuel supply apparatus for an internal combustion engine with a device for supplying fuel, according to the present invention.

In FIG. 1, a fuel supply apparatus for an internal combustion engine 10 of a motor vehicle or a stationary internal combustion engine is illustrated, which, in particular, is a self-igniting internal combustion engine. The fuel supply apparatus has a device 12 for supplying fuel from a storage tank 14. The device 12 has a supply pump and will be described in greater detail below. Downstream of the device 12, a high-pressure pump is arranged, whose suction side is supplied with the fuel from the device 12. Downstream from the high-pressure pump 16, a high pressure storage unit 18 is arranged, from which lines 20 lead to injectors 22 on the cylinders of the internal combustion engine 10. By means of the injectors 22, fuel is injected into the combustion chamber of the cylinder of the internal combustion engine 10. For regulating the injection process of the injectors 22, valves 21 are provided, through which the connection of the injectors 22 with the high-pressure storage unit 18 can be opened or closed. Alternatively, it can also be provided that instead of the high-pressure pump 16 and the high-pressure storage unit 18, a fuel injection pump is provided, whose suction side is connected with the device 12. Further, it can alternatively be provided that for each cylinder of the internal combustion engine 10, a high-pressure pump or fuel injection pump is provided, whose suction side is connected with the device. The high-pressure storage unit 18 is then not applicable.

Figure 2:
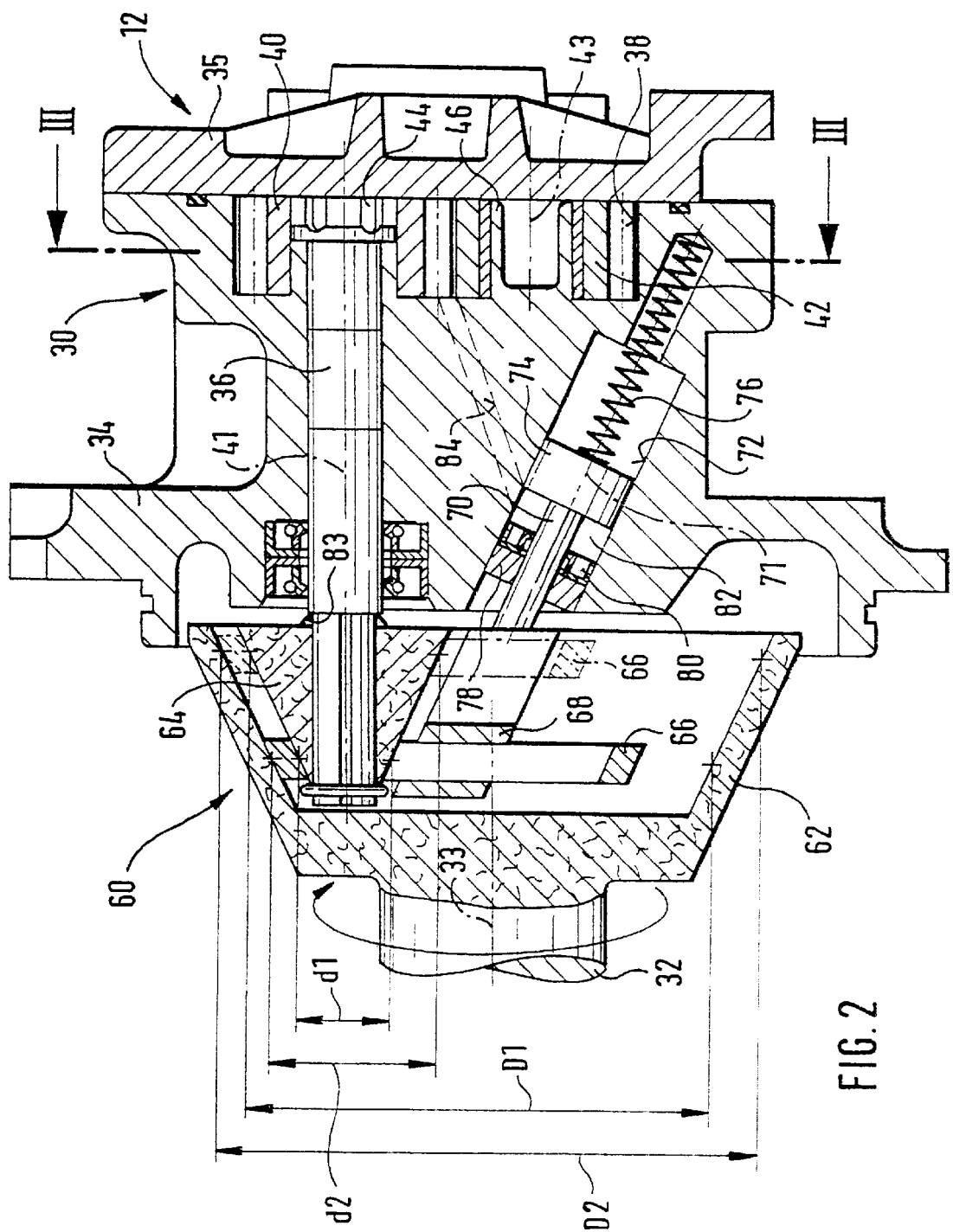
FIG. 2 shows the fuel-supply device of the present invention in a longitudinal section.
Figure 3:
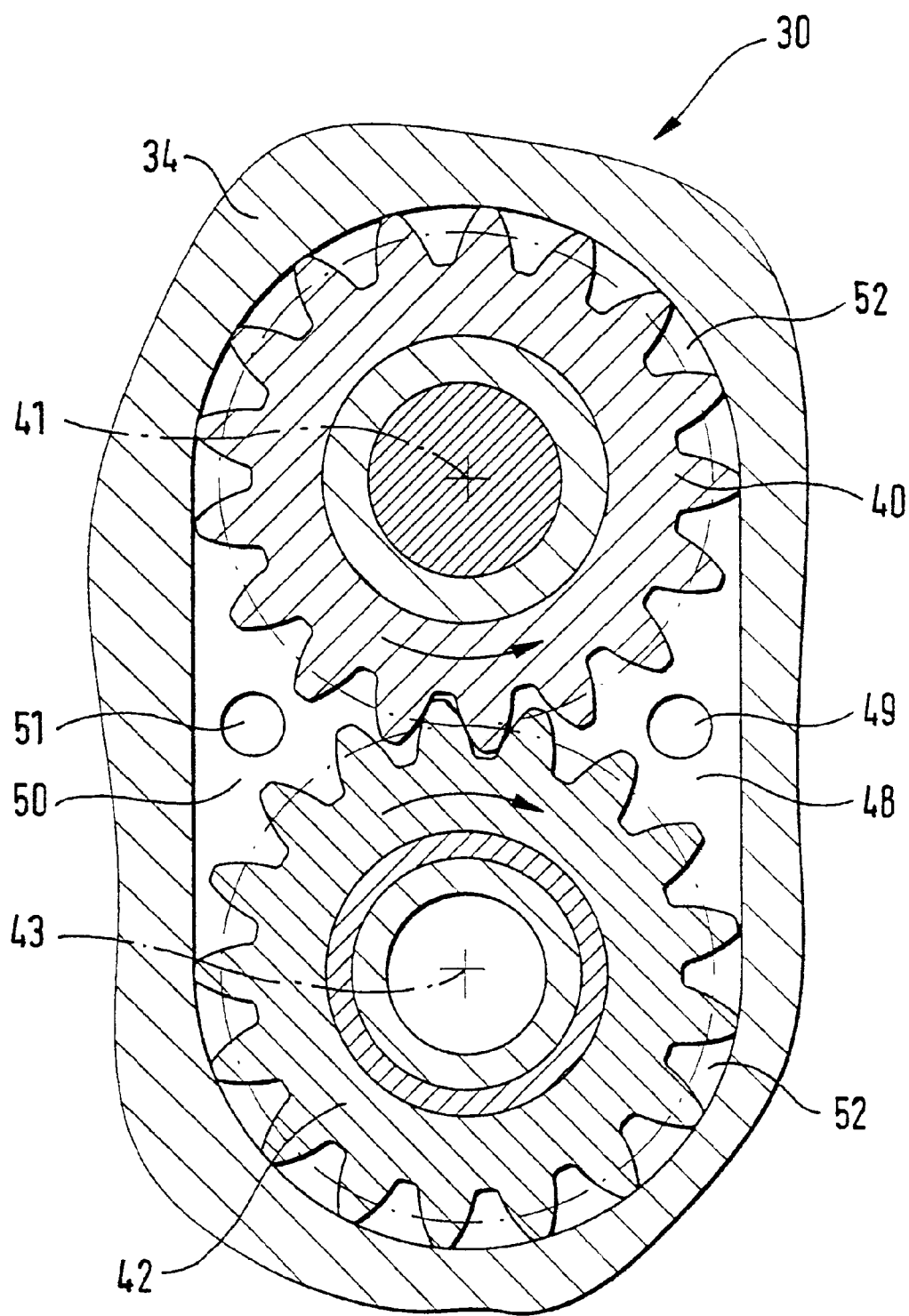
FIG. 3 shows the device of the present invention in a cross-section taken along Lines III—III in FIG. 2.

In FIGS. 2 and 3, the device 12 is shown in detail. The device 12 has a supply pump 30, which, by way of example, is a geared pump. However, an annular gear pump or another, appropriate type of pump also can be used to the same effect. For driving the supply pump 30, a drive shaft 32 is provided, which rotates about a rotational axis 33 and, for example, also can serve as the drive shaft of the high-pressure pump 16 or another shaft. The drive shaft 32 is driven at least indirectly through the internal combustion engine 10, for example, via a gear, a belt drive, or a chain drive. Preferably, the device 12 is directly flange-connected or mounted to the high-pressure pump 16 and forms a unit therewith.

The supply pump 30 has a housing 34, in which a drive shaft 36 is rotatably supported, an end of which projects from the housing 34. The supply pump is driven by a gear from the drive shaft 32, as will be described in greater detail below. In the housing 34, a pump chamber 38 is formed, which is closed by a cover portion 35 and in which a pair of peripherally meshed gears 40, 42 is arranged. The gears 40, 42 have radial serrations, which engage one another. The gear 40 is radially connected, via a coupling element 44, with the end of the drive shaft 36 projecting into the housing 34 and is thus rotatably driven by the drive shaft 36 about a rotational axis 41. The gear 42 is rotatably mounted about a rotational axis 43 on a journal 46 projecting into the pump chamber 38. The rotational axes 41, 43 of the gears 40, 42, respectively, run parallel to one another. Through the engagement of the gears 40, 42, the pump chamber 38 is divided into a suction side 48 and a pressure side 50. An inlet 49 on the suction side 48 opens into the pump chamber 38, through which fuel from the storage tank 14 is suctioned. An outlet 51 on the pressure side 50 opens into the pump chamber 38, through which the supplied fuel is conveyed to the suction side of the high-pressure pump 16. Upon operation, the supply pump 30 is supplied through its gears 40, 42 via supply channels 52 formed between the gear peripheries and dividing peripheral walls of the pump chamber 38 from the suction side 48 to the pressure side 50.

Next, the gear unit 60, by which the drive shaft 32 drives the drive shaft 36, will be more specifically described. The gear unit 60 is formed as a tapered ring gear and has a frictional bevel gear 62 connected with an end of the drive shaft 32. The frictional bevel gear 62 is formed as a hollow, beveled spur gear which, in its internal diameter, enlarges away from the drive shaft 32 and toward the drive shaft 36. A frictional bevel gear 64 is connected with the end of the drive shaft 36 that projects from the housing 34, the frictional bevel gear 64 having an outer diameter that decreases away from the drive shaft 36 and toward the drive shaft 32. The frictional bevel gear 64 of the drive shaft 36 is arranged within the frictional bevel gear 62 of the drive shaft 32. The drive shaft 32 and the drive shaft 36 are arranged offset to one another and perpendicular to their rotational axes, so that the fictional bevel gear 64 is disposed with its outer periphery a minimal distance from the inner periphery of the frictional bevel gear 62. Between the outer periphery of the frictional bevel gear 64 and the inner periphery of the frictional bevel gear 62, a tapered ring gear 66 is arranged, through which the frictional bevel gears 62, 64 roll off one another. The outer surfaces and the inner surfaces of tapered ring gear 66 are conically formed in the same direction. The tapered ring 66 is fixed between the outer periphery of the frictional bevel gear 64 and the inner periphery of the frictional bevel gear 62, whereby, conditional upon the friction during a rotation of the frictional bevel gear 62 about its rotational axis 33, the frictional bevel gear 64 likewise is shifted into rotation about its axis of rotation 41. The frictional bevel gear 64 is rotationally connected to the drive shaft 36 and, on the drive shaft 36, is adjustable in an axial direction. Between an annular collar or flange of the drive shaft 36 and the frictional bevel gear 64, a biased spring 83 is disposed, which, for example, is formed as a plate spring. By the spring 83, an axial bracing or biasing between the frictional bevel gear 64, the frictional bevel gear 62, and the tapered ring 66 is achieved, which makes possible the torque transference through friction from the frictional bevel gear 62 on the frictional bevel gear 64 via the tapered ring 66. The axis of rotation 33 of the frictional bevel gear 62 runs parallel to the rotational axis 41 of the frictional bevel gear 64. The gear ratio of the gear unit 60 is determined through the ratio of the diameter of the frictional bevel gear 62 to the diameter of the frictional bevel gear 64 in the plane in which the tapered ring 64 is disposed.

The tapered ring 66 is coupled with an adjustment element 68 by means of which the tapered ring 66 is movable in the direction of the axis of rotation 33, 41 of the frictional bevel gear 62, 64. The coupling of the adjustment element 68 with the tapered ring 66 is of the type where the tapered ring 66 can be turned opposite to the adjustment element 68, but is fixed in the direction of the axes of rotation 33, 41. The adjustment element 68 projects with a rod 70 into a pocket bore 72 and on an end of the rod 70, a piston 74 having a larger diameter is formed, which is tightly guided into the pocket bore 72.

Between the base of the pocket bore 72 and the face of the piston 74 that faces the pocket bore 72, a biased pressure spring 76 is disposed, through which the adjustment element 68 is pressed out of the pocket bore 72 and correspondingly presses the tapered ring to the left, as shown in FIG. 2. The rod 70 passes through a sleeve 78 positioned in the pocket bore 72, whereby near the sleeve 78, a sealing ring or gasket 80 is arranged, through which the rod 70 and the pocket bore 72 are sealed up to the gear unit 60. Between the sleeve 78 and the face of the piston 74 facing the spring 76, a pressure chamber 82 is defined in the pocket bore 72, which is connected to the pressure side 50 of the supply pump 30 via a bore 82 running in the housing 34. The pressure chamber 82 is, on the one hand, sealed by the piston 74, and on the other hand, sealed by the sealing ring 80. The adjustment element 68 is adjustably guided with its piston 74 into the pocket bore 72 and with its rod 74, into the sleeve 78. The piston 74 of the adjustment element 68 thereby is loaded, on the one hand, with the force from the spring 76, and on the other hand, with the pressure force produced from the supply pressure prevailing in the pressure side of the supply pump 30. Through the pressure force, the adjustment element 68 is pressed into the pocket bore 72 and correspondingly, the tapered ring 66 is pressed to the right, as shown in FIG. 2. The longitudinal axis 72 of the pocket bore 72 runs at an incline relative to the axes of rotation 33, 41 of the frictional bevel gears 62, 64. Alternatively, the pocket bore 72 can be so arranged that its longitudinal axis 71 runs approximately parallel to the axes of rotation 33, 41.

When the supply pressure on the pressure side 50 of the supply pump 30 is so small that the pressure force produced there by the piston on the adjustment element 68 is smaller than force maintained by the spring 76 on the adjustment element 68, the tapered ring 66 is found in its left end position, represented in FIG. 2 by the solid lines. The frictional bevel gear 62 has an internal diameter D1 in the radial plane in which the tapered ring 66 is arranged, and the frictional bevel gear 64 has an outer diameter d1. The gear ratio of the gear unit 60, therefore, is the ratio D1/d1, so that the rotational speed with which the drive shaft 36 is driven is multiplied by the rotational speed with which the drive shaft 32 is driven, which is multiplied by D1/d1. The diameter D1, for example, can be approximately 40 mm and the diameter d1 can be approximately 9 mm, so that a gear ratio of approximately 4.4 is provided. When the supply pressure on the pressure site 50 of the supply pump 30 increases, this exceeds the pressure force produced via the piston 74 on the adjustment element 68 and the force maintained through the spring 76, so that the adjustment element 68 is pressed in the direction of the longitudinal axis 71 into the pocket bore 72 and the tapered ring 66 is moved to the right, as shown in FIG. 2. The movement direction of the adjustment element 68 is along the longitudinal axis 71 of the pocket bore 72. In FIG. 2, the tapered ring 66 is illustrated with dashed lines in a right end position. Upon the movement of the tapered ring 66 to the right, the diameters of the frictional bevel gears 62, 64 change, by which the frictional bevel gears 62, 64 roll off one another via the tapered ring 66 and corresponding to the gear ratio of the gear unit 60. In the right end position, the frictional bevel gear 62 has an internal diameter D2 in the radial plane in which the tapered ring 66 is disposed, and the frictional bevel gear 64 has an outer diameter d2. The gear ratio of the gear 60 is, therefore, the ratio D2/d2, so that the rotational speed with which the drive shaft 36 is driven is multiplied by the rotational speed in which the drive shaft 32 is driven, which is multiplied by D2/d1. Since the outer diameter d2 of the frictional bevel gear 64 is substantially greater than its outer diameter d1, while the internal diameter D2 of the frictional bevel gear 62 is only slightly greater than its internal diameter D1, the gear ratio D2/d2 is smaller than the gear ratio D1/d1. The diameter D2, for example, can be approximately 47 mm and the diameter d2 can be approximately 17 mm, so that a gear ratio of approximately 2.7 is provided. Upon the movement of the tapered ring 66 from its left end position into its right end position with increased supply pressure from the pressure side of the supply pump 30, the gear ratio of the gear unit 60 is continuously reduced.

When the supply pump 30 produces a low supply pressure, which is particularly the case with lower rotational speeds, a large gear ratio of the gear unit 60 is produced by the adjustment element 68 and the tapered ring 66, so that the supply pump 30 is driven at a higher rotational speed and, therefore, produces a higher supply pressure. With increasing supply pressure, the gear ratio of the gear unit 60 is reduced by the adjustment element 68 and the tapered ring 66 until the tapered ring 66 finds itself in its right end position, as shown in FIG. 2. The movement of the adjustment element 68 can be limited in one or both directions, respectively, by a stop.

It will be understood that each of the elements described above, or two or more together, may also find a useful application in other types of constructions differing from the types described above.

While the invention has been illustrated and described herein as a fuel-supply device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for supplying fuel, comprising:

first and second drive shafts (32, 36), a supply pump (30) having at least one supply member (40), said supply member (40) coupled to said second drive shaft (32, 36), wherein said first drive shaft (32) drives said second drive shaft (36) by a gear unit (60), wherein said gear unit (60) is a tapered ring gear, said tapered ring gear having a first frictional bevel gear (62) connected to said first drive shaft (32) and a second frictional bevel gear (64) connected to said second drive shaft (36), wherein a tapered ring (66) is arranged between said first and second frictional bevel gears (62, 64), wherein said first and second friction bevel gears (62, 64) roll off one another by means of said tapered ring (66), and means to move the tapered ring (66) for changing a gear ratio of the gear unit (60) as a function of a supply pressure produced by said supply pump (30), whereby with a low supply pressure, a large gear ratio of the gear unit (60) is determined and with high supply pressure, a smaller gear ratio of the gear unit (60) is determined.

2. The device as defined in claim 1, wherein said gear ratio of said gear unit continuously changes as a function of said supply pressure.

3. The device according to claim 1, wherein rotational axes of said first and second frictional bevel gears (62, 64) run approximately parallel to one another.

4. The device as defined in claim 1, wherein said supply pump (30) is a geared pump.

5. The device as defined in claim 1, wherein said means includes the tapered ring (66) being coupled to an adjustment element (68), wherein said adjustment element (68) is movable from being acted upon by said supply pressure against a restoring force.

6. The device as defined in claim 5, wherein a movement direction (71) of said adjustment element (68) is slanted relative to rotational axes (33, 41) of said first and second frictional bevel gears (62, 64).

7. The device as defined in claim 1, wherein said first frictional bevel gear (62) is a hollow bevel gear, and wherein said second frictional bevel gear (64) is arranged within said hollow bevel gear (62).

8. The device as defined in claim 7, wherein said tapered ring (66) is arranged between an internal periphery of said hollow bevel gear (62) and an outer periphery of said second frictional bevel gear (64).

\* \* \* \* \*